(12) United States Patent
Sagi et al.

(10) Patent No.: US 8,496,986 B2
(45) Date of Patent: Jul. 30, 2013

(54) METHOD FOR PRODUCING HARD BUTTER COMPOSITION

(75) Inventors: Nobuo Sagi, Izumisano (JP); Kazuhisa Yamada, Izumisano (JP); Haruyasu Kida, Izumisano (JP)

(73) Assignee: Fuji Oil Company Limited, Osaka (JP)

( * ) Notice: Subject to any disclaimer, the term of this patent is extended or adjusted under 35 U.S.C. 154(b) by 169 days.

(21) Appl. No.: 13/258,754

(22) PCT Filed: Mar. 23, 2010

(86) PCT No.: PCT/JP2010/054977
§ 371 (c)(1),
(2), (4) Date: Oct. 17, 2011

(87) PCT Pub. No.: WO2010/110260
PCT Pub. Date: Sep. 30, 2010

(65) Prior Publication Data
US 2012/0027912 A1    Feb. 2, 2012

(30) Foreign Application Priority Data

Mar. 25, 2009 (JP) ................................ 2009-074513

(51) Int. Cl.
*A23D 9/04* (2006.01)
(52) U.S. Cl.
USPC .......................... 426/607; 426/601
(58) Field of Classification Search
USPC .......................................... 426/607
See application file for complete search history.

(56) References Cited

U.S. PATENT DOCUMENTS

| | | | |
|---|---|---|---|
| 4,268,527 A | 5/1981 | Matsuo et al. | |
| 4,275,081 A | 6/1981 | Coleman et al. | |
| 4,416,991 A | 11/1983 | Matsuo et al. | |
| 4,877,636 A | 10/1989 | Koyano et al. | |
| 4,910,037 A | 3/1990 | Sagi et al. | |
| 5,023,101 A | 6/1991 | Sugihara et al. | |
| 6,388,113 B1 | 5/2002 | Martinez Force et al. | |
| 6,410,831 B1 | 6/2002 | Osorio et al. | |
| 6,475,548 B2 | 11/2002 | Bons et al. | |
| 7,108,888 B2 * | 9/2006 | Floeter | 426/603 |
| 2009/0123633 A1 | 5/2009 | Cleenewerck et al. | |
| 2010/0196544 A1 | 8/2010 | Cleenewerck | |

FOREIGN PATENT DOCUMENTS

| | | |
|---|---|---|
| EP | 0 321 227 | 6/1989 |
| EP | 1 992 231 | 11/2008 |
| JP | 52-104506 | 9/1977 |
| JP | 55-71797 | 5/1980 |
| JP | 56-127094 | 10/1981 |
| JP | 61-242543 | 10/1986 |
| JP | 62-155048 | 7/1987 |
| JP | 63-240745 | 10/1988 |
| JP | 1-60330 | 3/1989 |
| JP | 2-406 | 1/1990 |
| JP | 3-69516 | 3/1991 |
| JP | 2008-543321 | 12/2008 |
| WO | 95/20313 | 8/1995 |

OTHER PUBLICATIONS

Patent Cooperation Treaty (PCT) International Preliminary Report on Patentability issued Oct. 18, 2011 in International (PCT) Application No. PCT/JP2010/054977 of which the present application is the national stage.
International Search Report issued Jun. 29, 2010 in International (PCT) Application No. PCT/JP2010/054977 of which the present application is the national stage.
Opinion of the Scientific Panel on Dietetic Products, Nutrition and Allergies on a request from the Commission related to the safety of *Allanblackia* seed oil for use in yellow fat and cream based spreads, The EFSA Journal, vol. 580, pp. 1-10, 2007.

* cited by examiner

*Primary Examiner* — Carolyn Paden
(74) *Attorney, Agent, or Firm* — Wenderoth, Lind & Ponack, L.L.P.

(57) ABSTRACT

Disclosed is a method whereby, in producing a hard butter composition being rich in SUS (2-unsaturated-1,3-disaturated triglyceride) via ester exchange by a 1,3-specific lipase, the production can be more conveniently or more efficiently carried out. In producing a hard butter composition being rich in SUS (2-unsaturated-1,3-disaturated triglyceride) via ester exchange by a 1,3-specific lipase, a low-melting point fraction of allanblackia fat is used as the main starting material, saturated fatty acids are selectively introduced into the 1- and 3-positions of the fat, and then fractionation is optionally conducted to thereby give an SUS-rich fraction.

10 Claims, No Drawings

METHOD FOR PRODUCING HARD BUTTER COMPOSITION

TECHNICAL FIELD

The present invention relates to a process for producing a hard butter composition, and also to a process for producing a hard butter composition using a particular low-melting point fraction fractionated from an allanblackia fat.

BACKGROUND ART

Allanblackia is a plant belonging to genus *Allanblakia* of family Guttifera which widely grows in Africa from Sierra Leone to Zaire, Rwanda, and Tanzania, and the genus includes some species such as *Stuhlmannii, Floribunda, Parviflora*, and *Klainei*. *Floribunda* is a tree having a height of 25 m and a diameter of 0.8 m, and grows in dense forests of a high humidity on a coast line in Ivory Coast. A fruit of the tree is larger as compared with other fruits in forests right on the equator, and has a cannonball shape having a length of about 30 cm and a diameter of 10 cm. This fruit is longitudinally separated into five chambers, and seeds are regularly aligned in two rows in each chamber. About 40 to 100 seeds (nuts) are contained in a fruit. In any species, its seed (nut) contains 50% or more of a fat in content, and sometimes as much as 70% of a fat.

The allanblackia fat contains a high content (60 to 80% by weight) of SOS (2-oleoyl, 1,3-disaturated triglycerides), and the rest is mainly composed of SOO (1 (or 3)-saturated-2,3 (or 1) dioleoyl triglycerides), and the content of SSS (wholly saturated triglycerides) is extremely low. As applications of the allanblackia fat, inventions such as use as one component for production of a chocolate (Patent Document 1), and utilization for the purpose of improving quality of a hard butter (Patent Document 2) have been found out. However, no idea of fractionating the allanblackia fat to concentrate particular triglyceride components for use has been found out.

On the other hand, the present applicant has succeeded in utilizing a high oleic sunflower oil in production of a hard butter as in Patent Document 3. This production process is a process for producing a hard butter composition including selectively introducing a saturated fatty acid into 1,3 positions of a fat or oil containing a high oleic sunflower oil as a part or all of the raw material, and fractionating the fat or oil to obtain a fat or oil rich in SUS (2-unsaturated, 1,3-disaturated glycerides). This is a method of converting a fat or oil containing UUU (triunsaturated fatty acid triglycerides) as a main component into a fat or oil rich in SUS by selectively introducing a saturated fatty acid into 1,3 positions of a high oleic sunflower oil as a raw material using a lipase having 1,3-position-specificity. However, the reaction oil obtained by the above method has an insufficient SUS content as a hard butter in the fat or oil. And, this process for producing a hard butter includes obtaining a medium melting point fraction having an increased SUS content of at least 50% by weight by subjecting the reaction oil to further fractionation in order to make a hard butter of good quality. According to this process, a hard butter composition of high quality can be stably produced. However, since a large amount of a saturated fatty acid introduction source in a substrate for interesterification with a lipase is necessary and whereby a bulky reactor is required, and a facility for fractionation and concentration by solvent fractionation is necessary after the reaction, there is a problem that the facility cost relating to an interesterification reaction and fractionation is too high.

In addition, the present applicant has also disclosed a method of increasing the SUS content without concentrating by solvent fractionation etc., as in Patent Document 4. This method is to perform interesterification of a raw material fat or oil and a fatty acid or a fatty acid ester to be introduced into 1,3 positions, with a 1,3-specific lipase, by dividing the reaction into a multistage, and thereby phased increasing the SUS content to obtain a hard butter of good quality, in such a fat or oil processing aspect that stearic acid is introduced into 1,3 positions of a fat or oil fraction rich in POP (2-oleodipalmitin), or palmitic acid or stearic acid is introduced into 1,3 positions of a fat or oil fraction rich in triolein.

For example, by repeating an interesterification reaction of 50 parts by weight of raw material fat or oil and 50 parts by weight of fatty acid ester five times, a fat or oil very similar to a cacao butter is obtained without fractionation and concentration by a solvent. According to this method, there is an advantage that a hard butter of good quality is obtained only by interesterification with a lipase and that a fractionation step is not essential, but there is a problem that it is necessary to perform an interesterification reaction in multistage, and that a production yield of a hard butter from a lipase reaction facility is low. In order to solve this problem, Patent Document 4 discloses a method of reducing the number of interesterification reactions to two stages to slightly increase the SUS content, and obtaining a cacao butter substitute having the objective SUS content by solvent fractionation, but this is also a method with which there remains a problem that repetitive utilization of an interesterification reaction facility, and that a fractionation facility is necessary.

On the other hand, an oil from a new breeding sunflower subsequent to a high oleic sunflower oil has also been disclosed. For example, species such as high stearic acid species of Patent Document 5 and high-stearic and high-oleic species of Patent Document 6 have already been known. However, their applications are margarine, shortening, and confectionery, and no description of utilization in a hard butter can be found. In addition, there is also a trial of directly fractionating a high-stearic and high-oleic sunflower oil to obtain an SUS fraction. Patent Document 7 is a representative example thereof and discloses a fat or oil for a margarine consisting of a hard fraction of a high-stearic and high-oleic sunflower oil and a vegetable liquid oil at a weight ratio of 20:80 to 80:20. In the previous fat or oil for margarine and shortening, hydrogenated oils of animal or vegetable fats or oils have been widely used, but since these hydrogenated fats or oils contain a large amount of trans fatty acids, which are problem in the risk on health in recent years. So the trial is that a high-stearic and high-oleic sunflower oil is directly fractionated to obtain an SUS fraction, as one of hard fats or oils not containing trans fatty acids. However, in this method, the fractionation yield is low and, moreover, the SUS content of the hard fraction is extremely low.

PRIOR ART DOCUMENTS

Patent Documents

Patent Document 1: EP 321227 B
Patent Document 2: JP 61-242543 A
Patent Document 3: JP 62-155048 A
Patent Document 4: JP 3-69516 B
Patent Document 5: WO 1995/20313 A
Patent Document 6: U.S. Pat. No. 6,388,113 B
Patent Document 7: U.S. Pat. No. 6,475,548 B

SUMMARY OF THE INVENTION

Problems to be Solved by the Invention

An object of the present invention is to provide a novel process for producing a hard butter, which is excellent in production efficiency, and by which a fat or oil rich in SUS (2-unsaturated, 1,3-disaturated triglyceride) is obtained.

Means for Solving the Problems

The present applicant has succeeded in utilizing a high oleic sunflower oil in production of a hard butter. Since a multistage interesterification reaction and fractionation were indispensable in that process, the present inventors subsequently have made efforts in reducing the production facility cost and the production cost. Under such circumstances, the present inventors have focused on the aforementioned specific composition of an allanblackia fat, that is, a composition in which almost all of 2-positions of triglyceride are occupied by oleic acid, and on that SOO would be concentrated in a low-melting point fraction obtained by fractionation of an allanblackia fat, and have found out that a production of a hard butter composition can be made more efficient by utilizing this fraction as a main raw material of 1,3-position-specific lipase-catalyzed interesterification. Thus, the present invention has been completed.

That is, a first aspect of the present invention is a process for producing a hard butter composition, which comprises obtaining a fat or oil in which the content of SUS (2-unsaturated, 1,3-disaturated glycerides, S: a saturated fatty acid having 16 to 24 carbon atoms, U: an unsaturated fatty acid having 16 to 18 carbon atoms) is 70% by weight or more by selectively introducing a saturated fatty acid into 1,3 positions of a low-melting point fraction of an allanblackia fat as a main raw material in which stearic acid is 25% by weight or more and oleic acid is 55% by weight or more in the constituent fatty acid composition, and a saturated fatty acid is 10% by weight or less in the fatty acid composition of the 2-position, and optionally, further fractionating the reacted low-melting point fraction. A second aspect is the process according to the first aspect, wherein the introduction of the saturated fatty acid into the fat or oil is performed by a one-stage interesterification reaction using a lipase by mixing the fat or oil with a free fatty acid or a lower alcohol ester of a fatty acid. A third aspect is the process according to the second aspect, wherein the ratio of the fat or oil in a substrate of the interesterification reaction is 10 to 90% by weight. The fourth aspect is the process according to the second aspect, wherein the ratio of the fat or oil in a substrate of the interesterification reaction is less than 40% by weight, and the reaction is performed without fractionation. The fifth aspect is the process according to the second aspect, wherein the ratio of the fat or oil in a substrate of the interesterification reaction is 25% by weight or more, and a fractionation is performed after the reaction. The sixth aspect is the process for producing a hard butter composition according to any one of the first to fifth aspects, wherein a fat or oil in which SUS is substantially StOSt (St: a saturated fatty acid having 18 carbon atoms, O: a monounsaturated fatty acid having 18 carbon atoms), and the StOSt content is 58% by weight or more is obtained.

Effects of the Invention

The present invention is a process of selectively introducing a saturated fatty acid into 1,3 positions of a low-melting point fraction of an allanblackia fat as a main raw material to obtain a hard butter composition having an SUS content of 70% by weight or more. According to the present invention, easy production of a hard butter composition has become possible, which does not require a fractionation after an enzymatic interesterification reaction and is further efficient. In addition, when fractionation is performed after an enzymatic interesterification, since the ratio of a raw material fat or oil in a reaction substrate of enzymatic interesterification can be improved, easy production of a hard butter at high production efficiency has become possible.

MODE OF CARRYING OUT THE INVENTION

The present invention is a process for producing a hard butter composition, which comprises obtaining a fat or oil in which the content of SUS (2-unsaturated, 1,3-disaturated glycerides, S: a saturated fatty acid having 16 to 24 carbon atoms, U: an unsaturated fatty acid having 16 to 18 carbon atoms) is 70% by weight or more by selectively introducing a saturated fatty acid into 1,3 positions of a low-melting point fraction of an allanblackia fat as a main raw material in which stearic acid is 25% by weight or more and oleic acid is 55% by weight or more in the constituent fatty acid composition, and a saturated fatty acid is 10% by weight or less in the fatty acid composition of the 2-position, and optionally, further fractionating the reacted low-melting point fraction.

It is important that the low-melting point fraction of an allanblackia fat utilized in the present invention has a specific composition that a 2-position is rich in oleic acid and contains only a small amount of a saturated fatty acid, and a majority of 1,3-positions are occupied by stearic acid and oleic acid. Thereby, introduction of a saturated fatty acid can be efficiently performed in a selective introduction of a saturated fatty acid into 1,3-positions of this fat or oil since 1,3-positions are already partially stearic acid. It is desirable that the amount of stearic acid in the constituent fatty acid composition is 25% by weight or more, preferably 30% by weight or more. When the amount of stearic acid is less than 25% by weight, it is necessary to decrease the ratio of the fat or oil in a substrate at introduction of a saturated fatty acid and to increase the ratio of a saturated fatty acid or a lower alcohol ester of a saturated fatty acid in order to increase the introduction amount of a saturated fatty acid, and thus, efficiency of production of a saturated fatty acid-introduced fat or oil is reduced. Therefore, it is not preferable.

The oleic acid content is preferably 55% by weight or more, more preferably 60% by weight or more. When the content is less than 55% by weight, the linoleic acid content necessarily increases, and the content of SLS (2-linol, 1,3-disaturated glycerides) which reduces tempering property, heat-resistance and shape keeping property of a hard butter after introduction of a saturated fatty acid increases, and thereby, deterioration in quality of a hard butter and decrease in the fractionation yield after interesterification occur. Therefore, it is not preferable. The oleic acid/linoleic acid ratio is 15 or more, more preferably 20 or more.

Further, it is preferable that a saturated fatty acid in a fatty acid composition of 2-position is 10% by weight or less, more preferably 5% by weight or less. When the amount of a saturated fatty acid exceeds 10% by weight, after introduction of a saturated fatty acid, production of SSS (trisaturated glycerides) and SSU (1,2-disaturated, 3-unsaturated glycerides) increase, and deterioration in tempering property, heat-resistance, shape keeping property and melting speed in the mouth, and decrease in the fractionation yield also occur. Therefore, it is not preferable.

The present invention is a process for producing a hard butter composition that an introduction of the saturated fatty acid into a fat or oil is performed with a single-stage interesterification reaction using a lipase after mixing the fat or oil and a free fatty acid or a lower alcohol ester of a fatty acid. As the saturated fatty acid, naturally-derived saturated fatty acid having 16 to 24 carbon atoms or a hydrogenated product of unsaturated fatty acid having 16 to 24 carbon atoms can be utilized. As the lower alcohol ester of a fatty acid, an ester in which a naturally-derived saturated fatty acid having 16 to 24 carbon atoms or a hydrogenated product of unsaturated fatty acid having 16 to 24 carbon atoms is esterified with a methyl alcohol, an ethyl alcohol, a butyl alcohol or the like can be used.

As the method of selectively introducing a saturated fatty acid into 1,3-positions in the present invention, a selective interesterification reaction with a 1,3-position-specific lipase can be utilized. The selective interesterification reaction with a 1,3-position-specific lipase is a reaction using an enzyme having selectivity that the enzyme interesterifies 1,3-positions, but does not interesterify a 2-position of triglyceride as a main component of a fat or oil. Examples of the enzyme exhibiting such selectivity include animal- or plant-derived enzymes such as pancreatic lipase and rice bran lipase, and enzymes derived from microorganism such as *Rhizopus delemar, Rhizopus japonicus, Rhizopus niveus, Aspergillus niger*, and *Mucor japonicus*. The reaction temperature is generally 20 to 75° C. In this selective interesterification reaction, it is preferable that a reaction is performed in a dry system where the water content in the system is 0.18% or less in order to suppress a production of diglycerides and trisaturated glycerides as a byproduct of the reaction as much as possible.

As the fat or oil of which a saturated fatty acid is selectively introduced into the 1,3-positions, a low-melting point fraction of an allanblackia fat as a main raw material and fats or oils in which a 2-position is rich in oleic acid, for example, palm oil, sal fat, illipe butter, kokum butter, shea butter, maua fat, olive oil, camellia oil, sasanqua oil, high oleic sunflower oil, high-stearic and high-oleic sunflower oil, high oleic safflower oil, and high oleic rapeseed oil can be suitably used. The fats or oils in which a 2-position is rich in oleic acid can be used in combination at an equivalent or less amount of the low-melting point fraction of the allanblackia fat, preferably a half amount or less of the fraction.

In the present invention, there are an aspect not requiring fractionation after selective introduction of a saturated fatty acid into 1,3-positions, and an aspect requiring fractionation after the introduction. As the fractionation method in the case where the fractionation is necessary, it is possible to use solvent fractionation, dry fractionation, detergent fractionation, distillation fractionation, zone melting, and the like. Usually, a solvent fractionation method or a dry fractionation method is suitably used.

The desired SUS content intended in the present invention is 70% by weight or more. When the SUS content is 50% by weight or more, it can be used as a hard butter for a chocolate. In order to obtain a good snapping property (a nature of being snapped at a normal temperature of around 20° C.), a melting speed in the mouth accompanying a cool feeling, a heat-resistance and a shape keeping property up to around 30° C., which are required for a chocolate, an SUS content of at least 70% by weight is required.

The ratio of a fat or oil in a substrate of the interesterification reaction in the present invention is 10 to 90% by weight. When the ratio of the fat or oil is 10% by weight or less, the SUS content of the interesterified oil can be made high, but it is necessary to distill 90% by weight of a fatty acid or a lower alcohol ester of a fatty acid. Therefore, energy efficiency is poor and, moreover, the production amount of the interesterified oil is small, and production efficiency becomes extremely low. Therefore, it is not preferable. Conversely, when the ratio of the fat or oil exceeds 90% by weight, the SUS content in the interesterified oil is low, interesterification alone does not realize the desired SUS content and, even when the fat or oil is fractionated, the fractionation yield is low, and production efficiency also becomes low. Therefore, it is not preferable.

In the case where it is intended to obtain a hard butter composition having the desired SUS content without fractionation after a interesterification reaction, it is necessary that the ratio of the fat or oil in a substrate is less than 40% by weight. In order to obtain a hard butter composition having the desired SUS content of 70% or more, it is necessary to appropriately adjust the ratio of the fat or oil in a substrate in a range of less than 40% by weight, depending on the stearic acid content in a constituent fatty acid of the low-melting point fraction of an allanblackia fat.

In the case where it is intended to obtain a hard butter composition having the desired SUS content by fractionation after an interesterification reaction, it is suitable that the ratio of the fat or oil in a substrate of interesterification is 25% by weight or more, preferably 40% by weight or more. This method includes performing a lipase reaction using a mixture of the low-melting point fraction of an allanblackia fat and a saturated fatty acid or a saturated fatty acid ester (the weight ratio is 25:75 to 90:10) as a substrate to make a reaction oil having an SUS content of 30 to 65% by weight, and thereafter, increasing the SUS content to the desired 70% by weight or more by fractionation. When the ratio of the fat or oil in a substrate is less than 25% by weight, the SUS content of an interesterified oil increases, but there is a problem that distillation load of a fatty acid or a lower alcohol ester of a fatty acid is large, and production efficiency of an interesterified oil is low. When the ratio of the fat or oil in a substrate exceeds 90% by weight, since the SUS content of an interesterified oil is low, and a fractionation yield is low. This is also not preferable from the viewpoint of production efficiency.

In the present invention, a main component of a hard butter composition in the case where stearic acid as a saturated fatty acid is introduced is StOSt (2-oleo, 1,3-distearin). As the hard butter composition containing StOSt as a main component, it is desirable that the StOSt content is 58% by weight or more, preferably 63% by weight or more. When the content is less than 58% by weight, a snapping property, a melting speed in the mouth accompanying a cool feeling, a heat-resistance and a shape keeping property up to around 30° C., which are required for a chocolate, become insufficient. Therefore, it is not preferable.

When the hard butter composition described to the above is utilized as a cacao butter substitute, it is preferable that the composition is mixed with a palm medium melting point fraction containing POP (2-oleo, 1,3-dipalmitin) as a main component, and the hard butter composition is mixed with the palm medium melting point fraction at a weight ratio of 40:60 to 70:30 so as to obtain a melting point and a melting behavior similar to those of a cacao butter. Alternatively, this hard butter composition can also be utilized as a cacao butter improver which improves the heat-resistance and shape keeping property of a cacao butter and, in that case, it is preferable that the composition is utilized by mixing the present hard butter composition with the palm medium melting point fraction at a weight ratio of 70:30 to 100:0.

EXAMPLES

The present invention will be explained below by way of examples.

An allanblackia fat (IV 39.2) was dissolved in n-hexane and fractionated, and a low-melting point fraction was recovered from the filtrate at a yield of 28%. The measurement results of its whole fatty acid composition and fatty acid composition of 2-position are shown in Table 1 together with a neutralized oil (IV 83.1) of a high oleic sunflower oil used in comparative examples.

TABLE 1

| | Fatty acid composition (%) | | | | | | | |
|---|---|---|---|---|---|---|---|---|
| | C16 | C18 | C18:1 | C18:2 | C20 | C22 | C24 | Others |
| HOH-whole | 3.5 | 3.0 | 87.1 | 4.6 | 0.3 | 0.9 | 0.3 | 0.3 |
| HOH-2-position | 1.2 | 0.1 | 93.0 | 4.9 | 0.3 | 0.0 | 0.0 | 0.5 |
| ALF-whole | 2.0 | 33.7 | 63.0 | 1.3 | 0.0 | 0.0 | 0.0 | 0.0 |
| ALF-2-position | 0.0 | 0.0 | 96.2 | 3.8 | 0.0 | 0.0 | 0.0 | 0.0 |

HOH: high oleic sunflower oil (neutralized oil),
ALF: low-melting point fraction of an allanblackia fat,
whole: whole fatty acid composition, and
2-position: fatty acid composition of 2-position.
Almost all of saturated fatty acids are coordinated at 1,3-positions, and almost all of 2-positions are occupied by oleic acid.

Example 1

One part by weight of a commercially available lipase derived from *Rhizopus niveus* and 2 parts by weight of diatomaceous earth were mixed, the mixture was made into particles while a suitable amount of cold water was diffused with stirring, and this was dried at 15° C. under reduced pressure to obtain a diatomaceous earth with enzyme having a water amount of 1.5% by weight. Separately, 10 parts by weight of the low-melting point fraction of an allanblackia fat and 90 parts by weight of ethyl stearate (93% purity) were heated to dry under reduced pressure to make a reaction substrate (water amount: 0.01% by weight), 3 parts by weight of the diatomaceous earth with enzyme was added thereto, the mixture was stirred at 43° C. for 3 days under sealing, and thereafter, a substrate oil was recovered. Further, the ethyl ester was removed by distillation to obtain a reaction oil a. This reaction oil a was bleached and deodorized to obtain a hard butter composition a.

Example 2

Twenty parts of the low-melting point fraction of an allanblackia fat and 80 parts by weight of ethyl stearate were heated to dry under reduced pressure to make a reaction substrate (water amount: 0.01% by weight), 3 parts by weight of the diatomaceous earth with enzyme of Example 1 was added thereto, the mixture was stirred at 43° C. for 3 days under sealing, and thereafter, a substrate oil was recovered. Further, the ethyl ester was removed by distillation to obtain a reaction oil b. This reaction oil b was bleached and deodorized to obtain a hard butter composition b.

Example 3

Thirty parts by weight of the low-melting point fraction of an allanblackia fat and 70 parts by weight of ethyl stearate were heated to dry under reduced pressure to make a reaction substrate (water amount: 0.01% by weight), 3 parts by weight of the diatomaceous earth with enzyme of Example 1 was added thereto, the mixture was stirred at 43° C. for 3 days under sealing, and thereafter, a substrate oil was recovered. Further, the ethyl ester was removed by distillation to obtain a reaction oil c. This reaction oil c was bleached and deodorized to obtain a hard butter composition c.

Comparative Example 1

Twenty parts by weight of the high oleic sunflower oil (neutralized oil) and 80 parts by weight of ethyl stearate were heated to dry under reduced pressure to make a reaction substrate (water amount: 0.01%), 3 parts of the diatomaceous earth with enzyme of Example 1 was added thereto, the mixture was stirred at 43° C. for 3 days under sealing, and thereafter, a substrate oil was recovered. Further, the ethyl ester was removed by distillation to obtain a reaction oil d. This reaction oil d was bleached and deodorized to obtain a hard butter composition d.

The triglyceride composition of the hard butter compositions a to d is shown in Table 2.

TABLE 2

| | Triglyceride composition (%) | | | | |
|---|---|---|---|---|---|
| | | Reaction substrate | | Composition of hard butter composition | |
| Sample name | ALF | HOH | StE | StOSt (%) | SUS (%) |
| Example 1: Hard butter composition a | 10 | — | 90 | 74.6 | 89.1 |
| Example 2: Hard butter composition b | 20 | — | 80 | 69.4 | 82.8 |
| Example 3: Hard butter composition c | 30 | — | 70 | 64.1 | 76.4 |
| Comparative Example 1: Hard butter composition d | — | 20 | 80 | 53.9 | 66.9 |

ALF: low-melting point fraction of an *allanblackia* fat,
HOH: high oleic sunflower oil,
StE: ethyl stearate In Examples 1 to 3, the intended SUS content of 70% by weight or more was attained, but in Comparative Example 1, the SUS content was not sufficiently high.

Example 4

Fifty five parts by weight of the low-melting point fraction of an allanblackia fat and 45 parts by weight of ethyl stearate (purity 93%) were heated to dry under reduced pressure to make a reaction substrate (water amount: 0.01% by weight), 3 parts by weight of the diatomaceous earth with enzyme of Example 1 was added thereto, the mixture was stirred at 43° C. for 3 days under sealing, and thereafter, a substrate oil was recovered. Further, the ethyl ester was removed by distillation to obtain a reaction oil e. This reaction oil was fractionated using normal hexane to obtain a medium melting point fraction e having the SUS purity of 85.0% by weight. The yield of this medium melting point fraction was 64.0% by weight.

Comparative Example 2

In the same manner as in Example 4 except that the low-melting point fraction of an allanblackia fat of Example 4 was replaced with the high oleic sunflower oil (neutralized oil), interesterification and fractionation were performed to obtain a medium melting point fraction f having the SUS content of 85.3%. The yield of this medium melting point fraction was fairly as low as 44.5%.

Comparative Example 3

In the same manner as in Example 4 except that the reaction substrate of interesterification of Example 4 was replaced with 30 parts by weight of the high oleic sunflower oil (neutralized oil) and 70 parts by weight of ethyl stearate (purity 930), interesterification and fractionation were performed to obtain a medium melting point fraction g having the SUS content of 83.6%. The yield of this medium melting point fraction was almost equal to that of Example 4 and 59.5%.

TABLE 3

|  | TG ratio | Reaction oil SUS content | Medium melting point fraction SUS content | Medium melting point fraction Fractionation yield |
| --- | --- | --- | --- | --- |
| Example 4 | 55% | 59.6% | 85.0% | 64.0% |
| Comparative Example 2 | 45% | 41.5% | 85.3% | 44.5% |
| Comparative Example 3 | 30% | 54.0% | 83.6% | 59.5% |

TG ratio: ratio of raw material fat or oil (TG) in interesterification substrate In Example 4, a high fractionation yield of 64.0% of the hard butter composition having the SUS content of 85.0% was obtained by interesterification of a substrate having a raw material fat or oil ratio of 55% and fractionation of the reaction oil. In Comparative Example 2 in which the raw material fat or oil mixing ratio was 45%, the fractionation yield of the hard butter composition having the same SUS content was as low as 44.5%, and production efficiency was low. In Comparative Example 3 in which the raw material fat or oil mixing ratio was 30%, the hard butter composition having the SUS content of 83.6% was obtained at a fractionation yield close to that of Example 4. However, since the ratio of a raw material fat or oil was low, production efficiency of an interesterified oil was low, and the distillation cost of a fatty acid ester was higher as compared with Example 4.

INDUSTRIAL APPLICABILITY

The present invention relates to a process for producing a hard butter used in a chocolate, and to a process for producing a hard butter, which is high in production efficiency, and is excellent in economic efficiency.

The invention claimed is:

1. A process for producing a hard butter composition, which comprises obtaining a fat or oil in which the content of SUS (2-unsaturated, 1,3-disaturated glycerides, S: a saturated fatty acid having 16 to 24 carbon atoms, U: an unsaturated fatty acid having 16 to 18 carbon atoms) is 70% by weight or more by selectively introducing a saturated fatty acid into 1,3 positions of a low-melting point fraction of an allanblackia fat as a main raw material in which stearic acid is 25% by weight or more and oleic acid is 55% by weight or more in the constituent fatty acid composition, and a saturated fatty acid is 10% by weight or less in the fatty acid composition of the 2-position, and optionally, further fractionating the reacted low-melting point fraction.

2. The process according to claim 1, wherein the introduction of the saturated fatty acid into the fat or oil is performed by a one-stage interesterification reaction using a lipase by mixing the fat or oil with a free fatty acid or a lower alcohol ester of a fatty acid.

3. The process according to claim 2, wherein the ratio of the fat or oil in a substrate of the interesterification reaction is 10 to 90% by weight.

4. The process for producing a hard butter composition according to claim 3, wherein a fat or oil in which SUS is substantially StOSt (St: a saturated fatty acid having 18 carbon atoms, O: a monounsaturated fatty acid having 18 carbon atoms), and the StOSt content is 58% by weight or more is obtained.

5. The process according to claim 2, wherein the ratio of the fat or oil in a substrate of the interesterification reaction is less than 40% by weight, and the reaction is performed without fractionation.

6. The process for producing a hard butter composition according to claim 5, wherein a fat or oil in which SUS is substantially StOSt (St: a saturated fatty acid having 18 carbon atoms, O: a monounsaturated fatty acid having 18 carbon atoms), and the StOSt content is 58% by weight or more is obtained.

7. The process according to claim 2, wherein the ratio of the fat or oil in a substrate of the interesterification reaction is 25% by weight or more, and a fractionation is performed after the reaction.

8. The process for producing a hard butter composition according to claim 7, wherein a fat or oil in which SUS is substantially StOSt (St: a saturated fatty acid having 18 carbon atoms, 0: a monounsaturated fatty acid having 18 carbon atoms), and the StOSt content is 58% by weight or more is obtained.

9. The process for producing a hard butter composition according to claim 2, wherein a fat or oil in which SUS is substantially StOSt (St: a saturated fatty acid having 18 carbon atoms, O: a monounsaturated fatty acid having 18 carbon atoms), and the StOSt content is 58% by weight or more is obtained.

10. The process for producing a hard butter composition according to claim 1, wherein a fat or oil in which SUS is substantially StOSt (St: a saturated fatty acid having 18 carbon atoms, O: a monounsaturated fatty acid having 18 carbon atoms), and the StOSt content is 58% by weight or more is obtained.

* * * * *